United States Patent [19]

Tamir

[11] Patent Number: 4,699,238
[45] Date of Patent: Oct. 13, 1987

[54] STEERING WHEEL LOCKING DEVICE FOR ROAD VEHICLES

[76] Inventor: Mosheh Tamir, 12 Moyal St., Tel Aviv, Israel

[21] Appl. No.: 932,006

[22] Filed: Nov. 18, 1986

[30] Foreign Application Priority Data

Nov. 27, 1985 [IL]  Israel .................................. 77170
Aug. 14, 1986 [IL]  Israel .................................. 79713

[51] Int. Cl.⁴ .................................................... B60R 25/02
[52] U.S. Cl. ........................................... 180/287; 70/238
[58] Field of Search ................. 180/287; 70/237, 252, 70/238

[56] References Cited

U.S. PATENT DOCUMENTS

| | | | |
|---|---|---|---|
| 1,193,679 | 8/1916 | Fox | 70/238 |
| 2,716,336 | 8/1955 | Ross | 70/238 |
| 3,190,090 | 6/1965 | Zaidener | 70/238 |
| 3,245,239 | 4/1966 | Zaidener | 70/238 |
| 3,690,131 | 9/1972 | Davis | 70/238 |

FOREIGN PATENT DOCUMENTS 1127524  9/1968  United Kingdom ............... 180/287

Primary Examiner—John J. Love
Assistant Examiner—Ross Weaver
Attorney, Agent, or Firm—Ostrolenk, Faber, Gerb & Soffen

[57] ABSTRACT

An externally-applied steering wheel locking device for vehicles is disclosed, which comprises a hook-like member configured to cap the central, hub portion of the wheel. A padlock body is placed on and affixed to the member in a position conveniently accessible by the driver. An elongated rod is adapted to be locked by the padlock after its lower end is coupled to one or more of the vehicle foot pedals. The padlock may be of the double-bore, yoke-type, and the rod, at least at its upper end, is comprised of a pair of parallel rod sections fitting into the yoke bores of the padlock.

10 Claims, 9 Drawing Figures

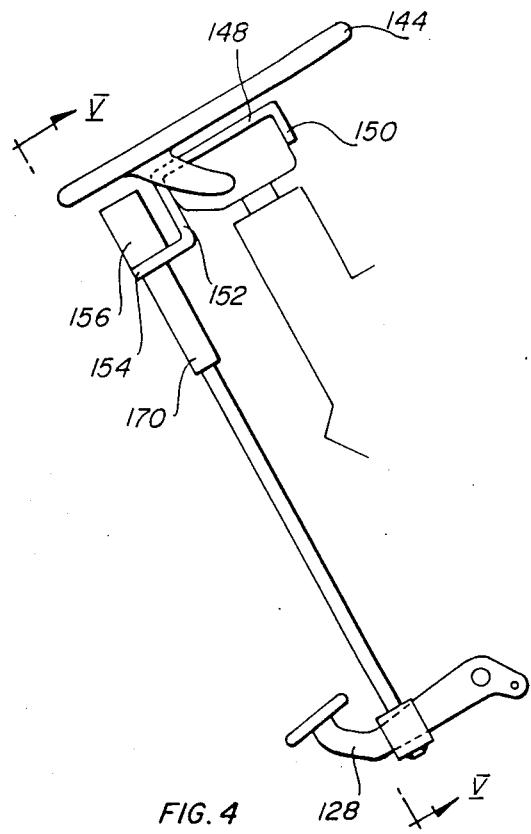
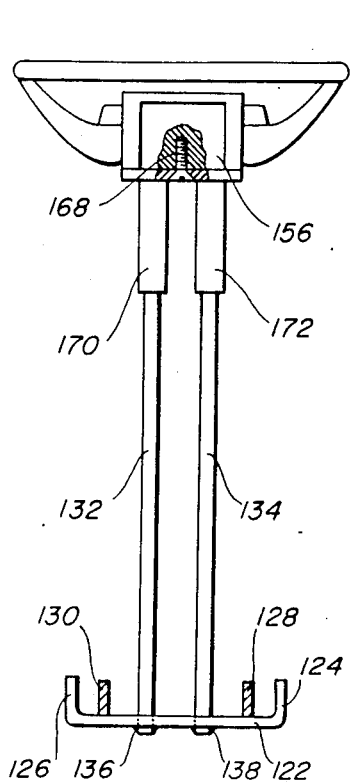
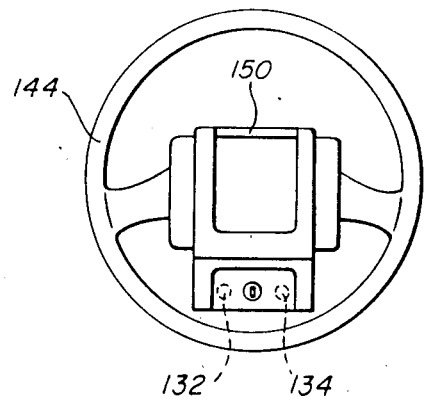
FIG. 5
FIG. 4
FIG. 6

STEERING WHEEL LOCKING DEVICE FOR ROAD VEHICLES

BACKGROUND OF THE INVENTION

The present invention relates to anti-theft devices for vehicles, and more particularly to steering wheel locking devices adapted to prevent turning of the wheel as a protection against car theft attempts.

Steering wheel arresting devices are known (cf. U.S. Pat. Nos. 3,690,131, 4,432,432 and many others), which generally comprise an elongated, extendible member with a locking device for setting the length as required, and a pair of hooks at each side of the member, one adapted to be releasably fastened to one of the pedals of the vehicle and the other—to become hooked around the rim or one of the spokes of the steering wheel.

It has however been established that these devices do not deter car thieves, and in fact are easily overcome by simply bending down—or cutting through—the rim of the steering wheel at one point, and thereby release the grip of the upper or lower hooks.

It is thus the major object of the invention to improve the steering wheel locking devices in the above-mentioned respect.

It is a further object of the invention to provide a steering wheel locking device of the kind referred to that is adapted to arrest—not the rim or a spoke of the wheel—but the central hub thereof.

It is a still further object of the invention to provide a hub arresting member and associated lock device of simple design, convenient use and attractive appearance.

It is a still further object of the invention to provide a padlock of a novel design especially suitable for its purpose as a part of the steering wheel locking device.

It is a still further object of the invention to provide a steering wheel locking device employing a standard yoke- or shackle-type padlock.

SUMMARY OF THE INVENTION

According to the invention there is provided a road vehicle steering wheel locking device comprising an anchor member adapted to be releasably attached to a fixed portion of the vehicle located generally below the steering wheel, an elongated member extending to a length substantially equal to the distance between the said fixed portion and the steering wheel, a hook-like member adapted to overlie and partly extend around a portion of the wheel, and a lock device for locking the elongated member to the hook-like member, characterized in that the hook member is configured to cap the central hub portion of the wheel. Various designs of cap members are feasible, in conjuction with single bore or double, yoke-type padlocks.

BRIEF DESCRIPTION OF THE DRAWINGS

A few preferred embodiments of the invention will be described with reference to the accompanying drawings, wherein—

FIG. 4 is a side view of the device of FIG. 3;

FIG. 5 is a view taken along lines V—V of FIG. 3;

FIG. 6 is a top view of FIG. 4;

DETAILED DESCRIPTION OF THE PREFERRED EMBODIMENTS

Figure 1:
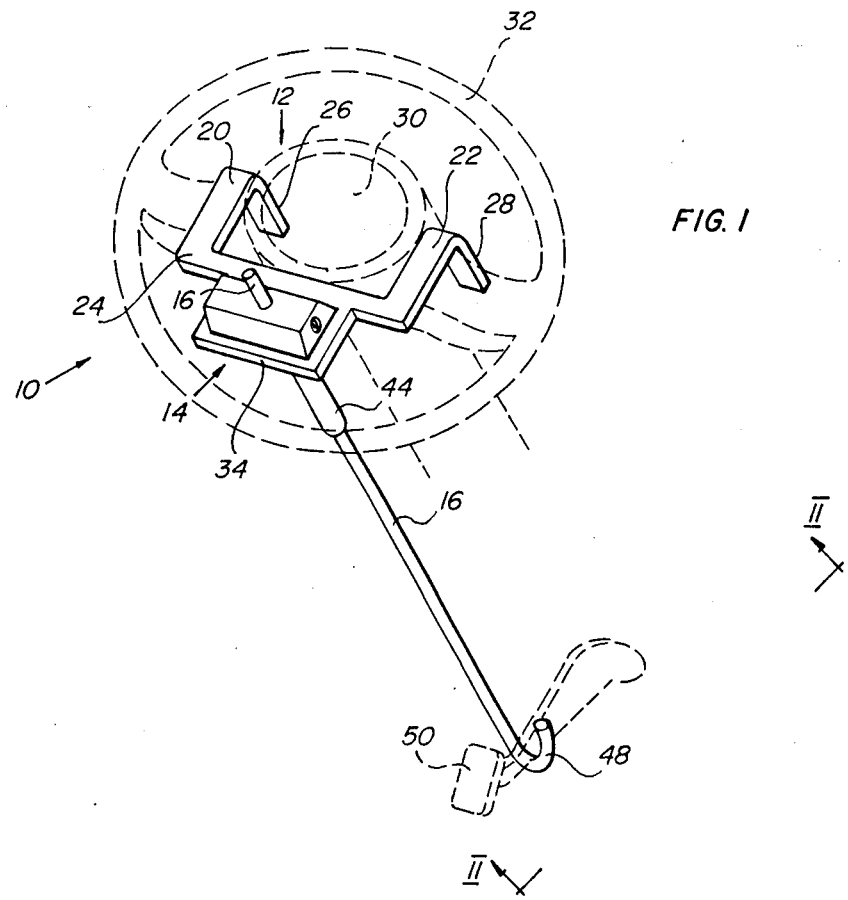
FIG. 1 is a schematic, three-dimensional view of the device according to a first embodiment of the invention, in its mounting position.
Figure 2:
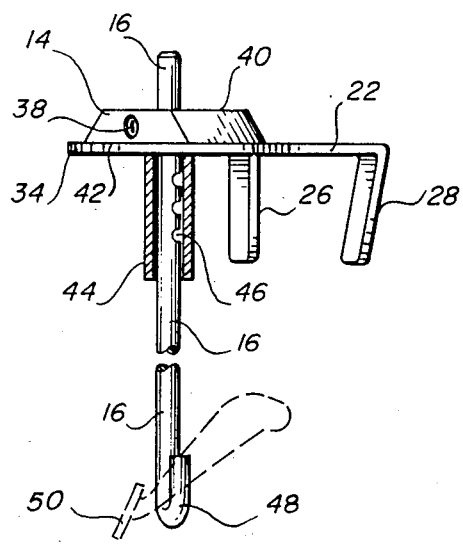
FIG. 2 is a partly sectional view of the device taken along line II—II of FIG. 1.

The locking device generally designated 10, in FIGS. 1-2 consists of a hook-like, wheel hub arresting cap member 12, a padlock body 14, and an elongated member 16.

Figure 3:
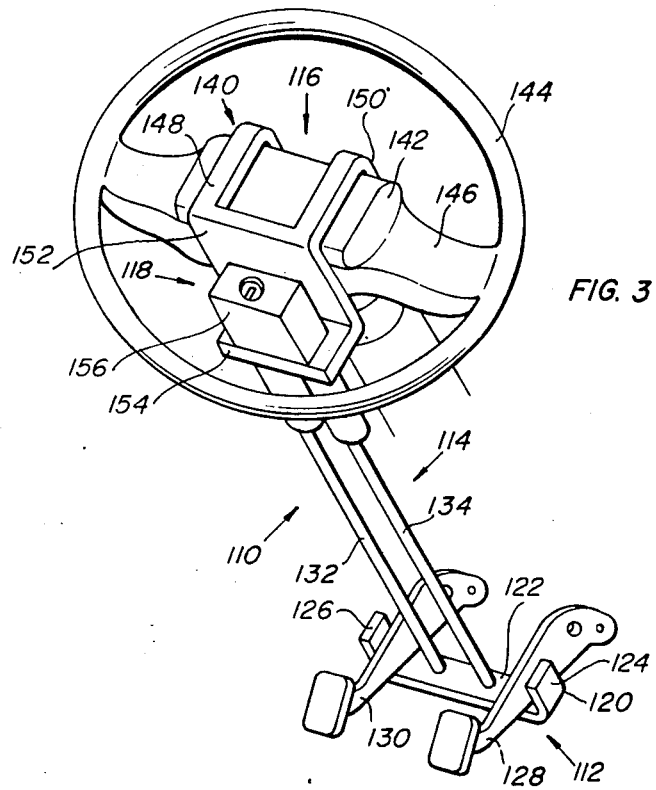
FIG. 3 shows a second embodiment of the invention.
Figure 9:
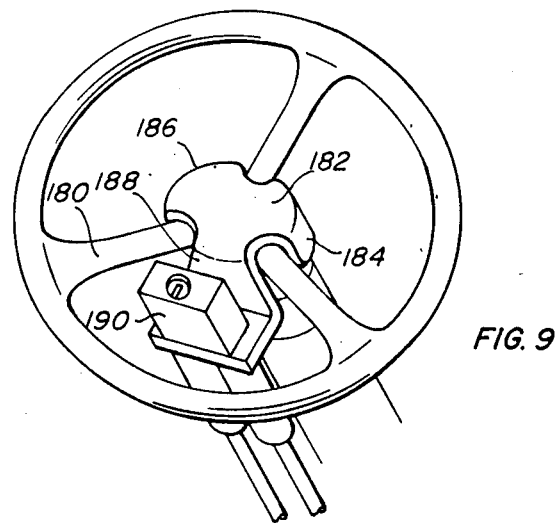
FIG. 9 shows a device with a cap member modified to fit three-spokes type wheel.

The member 12 may be of any suitable design and shape, e.g. as shown in FIGS. 3 or 9; however, it would preferably be made of sheet metal of high mechanical strength such as hardened steel, which is cut-out and formed as a generally L-shape profile. It will thus include the following portions: One, upper leg portion which is generally U-shaped comprising two legs 20 and 22 and web 24, all lying in the same plane, and a depending leg portion comprised of two spaced bars 26 and 28 configured to embrace hub portion 30 of steering wheel 32.

The web 24 includes a widened portion 34, preferably integral with and designed to underlie the padlock body 14. While various conventional, single-bore padlocks are suitable for the purpose in question, it has been found advisable to adopt a body having a trapezoid cross-section provided with its cylinder mechanism 38 extending longitudinally in the middle between parallel surfaces 40 and 42 thereof. The padlock body 14 can thus conveniently be fabricated from standard hexagonal metal bars cut in half along their longitudinal axes.

Alternatively, semi-circular profiled bodies can be used. To the underside of the extension 34 of the portion 24, a downwards depending sleeve 44 is welded or otherwise fixed, for guiding the insertion of and providing protection for the free end of the rod 16. The rod is formed with notches 46 at its upper end for the look mechanism of the padlock 14, and with a bent-over portion 48 at its lower end, which is designed to embrace foot pedal 50 of the vehicle, as in the conventional devices.

It will be further noted that the padlock 14 is mounted on the member 12—actually, the portion 34 thereof—in a sidewise directed position, for facilitating a more convenient insertion of a key by the driver sitting behind the wheel 32.

The operation of the device is described in detail further below in connection with the alternative embodiment of the invention (FIGS. 3-9).

The locking device 110 as shown in FIGS. 3-5 again comprises three main parts, namely an anchor section generally designated 112, an elongated section 114 and a generally hook-shaped top section 116 with a lock device 118.

In more detail, section 112 of the device 110 is comprised of a U-shaped metal bar 120 having web 122 and two uprights 124 and 126. The distance between the uprights 124 and 126 is such that the brakes pedal 128 and the clutch pedal 130 can be nested therebetween. In the same manner the anchor section 122 can be fitted to the brakes and the accelerator pedals (not shown) or, in fact, be designed to become safely attached to any suitably located fixed portion of the car chassis provided for this purpose.

A pair of rods 132 and 134 project from the web portion 122 and are safely secured thereto, as by welding spots 136, 138 (FIG. 5). The rods are preferably made of steel and are thermally treated to resist cutting or sawing by burglary tools.

Section 116 of the device 110 comprises a generally U-shaped member 140 shaped to cap or embrace from above hub portion 142 of steering wheel 144. In the exemplified embodiment, wheel 144 is provided with a single, cross-wise diametrically extending spoke member 146, which is now the most popular design (rather than the old-fashioned three-spoke design shown in FIG. 9—see below).

Member 140 is preferably produced of a flat steel bar to include a top portion 148 (which is partly cut-away to reduce its weight), a first depending portion 150 (FIG. 4), a complementary depending portion 152 and a sidewise extending portion 154, the latter forming a support for fixedly mounting thereon the detachable body of an otherwise conventional shackle or yoke-type padlock body 156.

It will be thus noted that one of the advantages of the present embodiment is to incorporate and make effective use of the conventional, readily commercially available yoke-type padlocks, namely, locks with a separable yoke rather than the single-rod locking arrangement per the preceding embodiment.

Figure 7:
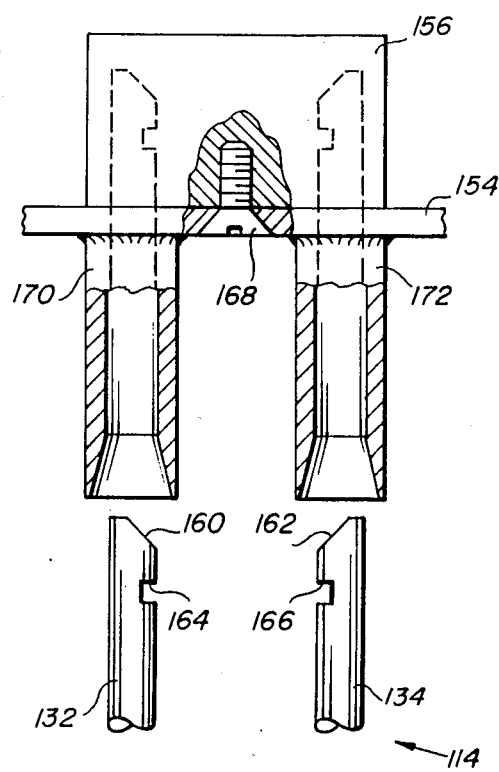
FIG. 7 is a detail of construction of the device of FIG. 3.

Thus, as shown in greater detail in FIG. 7, the distance between the rods 132 and 134—as well as their upper portions which comprise tapering surfaces 160, 162 and notches 164 and 166—are made exactly as if they belonged to the original yoke fitting to the padlock body 156 of any particular lock model selected to be used in conjunction with the device according to the present invention. The lock body 156 may be attached to the projection 154 by one or more stud screws 168 on the one hand, and on the other hand be extended by bushings 170 and 172 that may be welded fron below to form guides for the free ends of the double-rod elongated section 114.

Figure 8:
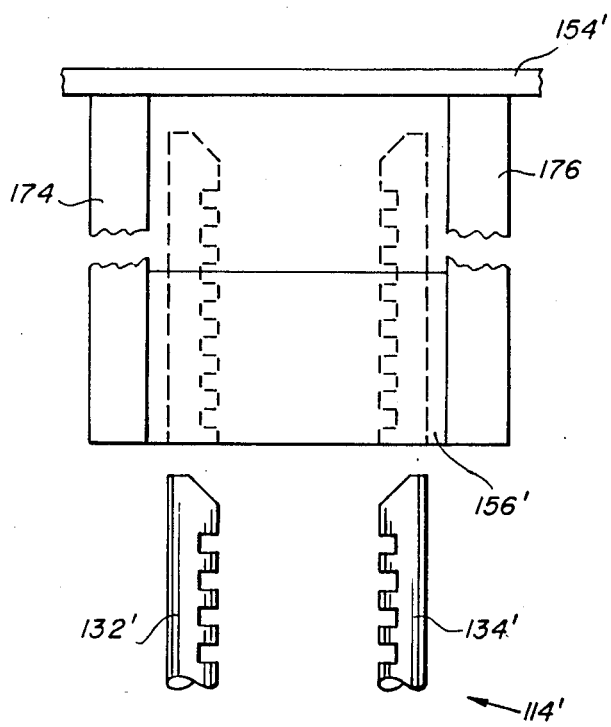
FIG. 8 shows a different arrangement similar to that of FIG. 7.

Alternatively, and as shown in FIG. 8, the padlock body may be mounted at any lower position with respect to the projection 154, by using a pair of depending bars or rods 174, 176 and attaching the body 156' at any location therebelow; the double-rod member 114' will, of course, be made shorter but become engaged with the padlock body 156' in the manner as aforedescribed.

A still further modification may be to use a yoke-type padlock, but wherein the yoke legs are adapted to penetrate and go through the body, as shown by broken lines in FIG. 8. In this manner a more exact and universally applicable adjustment of the total length of the device 110 may be attained, to adapt its use for various car models. In operation of the device, namely when it is mounted to protect the vehicle against car thieves, the elongated, double-rod section 14 will be separated from the top, cap member 116 with the lock 118, the member 114 will be inserted from below against the bottom side of the car foot pedals 128 and 130 and at the same time the cap member 116 will be dressed over to cover the central, hub portion of the wheel 142, with the two free ends of the rods 132 and 134 become latched by the padlock body 156. Thus, not only that cutting away or bending a portion of the steering wheel rim will be of no effect whatsoever, but the wheel itself becomes safely protected against turning in one or the other directions by the counter-moment of forces achieved by the rectangular, stiff framework constituted by the two rods of the elongated member 114 and the top and bottom mounting sections 112 and 116.

Yet an additional car-thieves deterrent is readily devised by a combination of the device and the sound horn of the vehicle. Hence, when the cap member is tightened against the wheel hub, the sound horn button is pressed down. To avoid undue hooting, a disconnection switch of the circuit must be incorporated with additional means for modifying its operation so that a release of the button will activate the horn. The unauthorized dismounting of the wheel locking device will therefore cause an alarm hoot to be emitted. FIG. 9 illustrates the adaptation of the locking device of the present invention to old-fashioned steering wheel designs comprising three spokes 180—rather than the generally diametrically-extending spoke and hub design shown in the previous figures. Hence, there is provided a cap member 182 with three finger-like extensions 184, 186 and 188, the latter being extended in an analogous manner to the previous embodiment, to support the padlock body 190.

It has been thus established that the device proposed according to the present invention exhibits a safety level superior to that of conventional devices, at no substantial increase in its manufacturing costs, and no less convenient in its use.

Those skilled in the art will readily understand that various changes, modifications and variations may be applied to the invention as heretofore exemplified without departing from the scope thereof as defined in and by the appended claims.

What is claimed is:

1. A road vehicle steering wheel locking device comprising an anchor member adapted to be releasably attached to a fixed portion of the vehicle located generally below the steering wheel, an elongated member extending to a length substantially equal to the distance between the said fixed portion and the steering wheel, a hook-like member adapted to overlie and partly extend around a portion of the wheel, and a lock device for locking the elongated member to the hook-like member, characterized in that the hook-like member is configured to cap the central hub portion of the wheel.

2. The device as claimed in claim 1 wherein the hook-like member is generally L-shaped, one leg of which is adapted to overlie the hub and the other to depend downwards at one side of the hub, a padlock body being affixed to the said one leg at its side away from the other leg, the elongated member being a rod passing through and adapted to be locked by the padlock.

3. The device as claimed in claim 2 wherein the padlock body is attached to the hook-like member in a sidewise angled position.

4. The device as claimed in claim 3 wherein the padlock body is of a trapezoid cross-section.

5. The device as claimed in claim 2 wherein the said one leg of the hook-like member is U-shaped, and the said other leg consists of two spaced parallel bars.

6. The device as claimed in claim 5 wherein the hook-member is made of punch-out sheet-metal.

7. The device as claimed in claim 2 wherein the lock device is comprised of a yoke-type padlock body and the elongated member is comprised, at least along a substantial length thereof, of a pair of parallel, distanced rods fitting into the yoke bores of the padlock.

8. The device as claimed in claim 7 wherein the said anchor member comprises a cross-member adapted to fit below and partly around two of the vehicle foot-pedals.

9. The device as claimed in claim 8 wherein the hook-member is formed of a profiled metal bar.

10. The device as claimed in claim 10 wherein the said profile comprises a projecting portion for attaching thereto the said padlock body.

* * * * *